INVENTORS
TADEUSZ BUDZICH
ARNOLD PITT

By

Attorney

United States Patent Office 3,180,080
Patented Apr. 27, 1965

3,180,080
FLUID POWER SYNCHRONIZING DRIVE
Tadeusz Budzich, 3344 Colwyn Road, Cleveland, Ohio, and Arnold Pitt, 5 Hill Garden Road, Weston, Ontario, Canada
Filed Jan. 28, 1963, Ser. No. 254,394
19 Claims. (Cl. 60—19)

This invention relates generally to power drives for coupled loads and has a particular significance in connection with power drives of tractor-trailer arrangements and drives between the power trains of multi-axle vehicles. In more particular aspects this invention relates to means to maintain a multiplicity of power drives in synchronized driving engagement. In still more particular aspects this invention relates to a multiplicity of power drives, mechanically interconnected, in which fluid power drives act as synchronizing means.

According to prior art teachings the power drives of a tractor-trailer unit or multi-axle vehicle were connected through shafts, and universal joints to differentials to drive the wheels from a common prime mover. This method suffered from at least one serious disadvantage. To transmit the power to all the driving wheels of the vehicle all tires had to be working at approximately the same loaded radius. With the change in the loaded radius of any particular branch of the power train, a sliding motion was introduced between the tire and the road surface, causing power losses and unnecessary wear of the tire because of normally inherent variations due to uneven tire wear, tire pressure, load distribution, etc., it is virtually impossible to maintain all of the wheels at the same loaded radius. This difference in loaded radii not only lowered the efficiency of the drive but under certain driving conditions had a detrimental effect on the stability of the vehicle.

It is therefore a principal object of the present invention to provide an improved power drive for a multiplicity of coupled loads.

Another object of this invention is to provide a fluid means for synchronizing the power drives of coupled loads.

Still another object of this invention is to provide fluid power means having separate branches of power drive, in which the power transmitted through those means is proportional to the difference in mechanical advantage of those separate branches of power drive thereby synchronizing the drives.

Still another object of this invention is to provide fluid power means for multiplicity of power drives through which the amount of power transmitted to the branches of the mechanical train can be varied to synchronize the drives.

Other objects and advantages of the present invention will become apparent from the following description, reference being had to the accompanying drawings in which.

Figure 1:
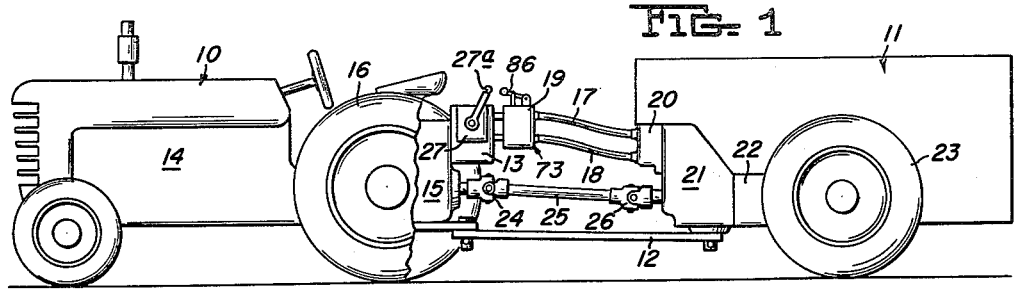
FIGURE 1 is an elevational view somewhat schematic of the synchronizing drive of this invention applied to tractor and power trailer arrangement.

Referring now to the drawings, and particularly to FIGURE 1, a tractor 10 and a powered trailer 11 are schematically illustrated with a draw bar 12 linking them together. The tractor 10 is provided with an engine 14 which drives traction wheels 16 through a conventional drive system 15. A variable displacement hydraulic pump 13 is mounted on the tractor 10 and is drivingly connected to the engine 14, through the drive 15. The variable displacement pump 13 is connected through conduits 17 and 18 and direction control valve 19 to a hydraulic motor 20 mounted on the trailer 11. The motor 20 is drivingly connected through a gear train 21 and a conventional differential 22 to driving wheels 23 of the trailer 11. The traction wheels 16 of the tractor 10 and the driving wheels 23 of the trailer 11 are drivingly connected through the drive 15, a first universal joint 24, a universal shaft 25, a second universal joint 26, the gear train 21 and the differential 22 with each other and with the variable engine 14 in a manner which will be described. The variable displacement pump 13 is equipped with a conventional automatic pressure control 27, the pressure response level being adjustable by control lever 27A.

Figure 2:
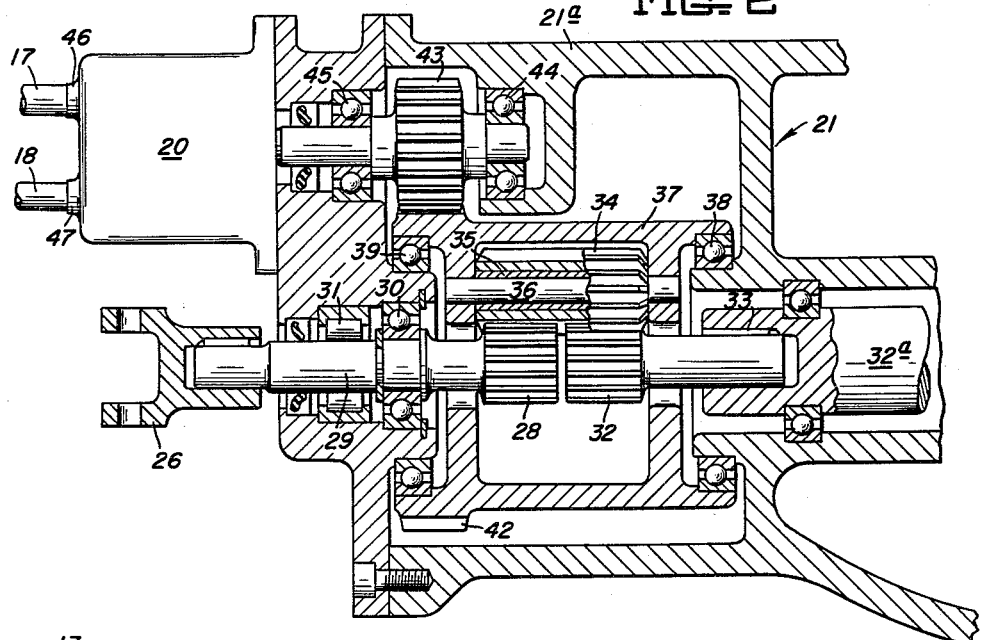
FIGURE 2 is a diagrammatic sectional view of the gear train of the synchronizing drive mounted on the axle differential.

Referring now to FIGURE 2, the gear train 21 which is interposed between the wheels 16 and 23 has a casing 21A mounted on the differential 22 of the trailer. The second universal joint 26 is drivingly connected to an input gear 28, through a shaft 29, journalled for rotation by bearings 30 and 31 in the casing 21A. An output gear 32 is mounted on shaft 32A which shaft is keyed by key 33 to drive the trailer differential 22. The input gear 28 and the output gear 32 are in meshing engagement with a pinion gear 34. The pinion gear 34 is journalled by bearings 35 on a pin 36, which pin forms a part of a cage 37. The cage 37 is journalled for rotation on the casing 21A by bearings 38 and 39. The cage 37 is equipped with gear teeth 42 which work in meshing engagement with a synchronizing pinion 43. The synchronizing pinion 43 is journalled in the casing 21A by bearings 44 and 45, and is drivingly connected to the fluid motor 20, mounted on the casing 21A. The fluid motor 20 has ports 46 and 47 connected to the conduits 17 and 18 respectively.

Figure 3:
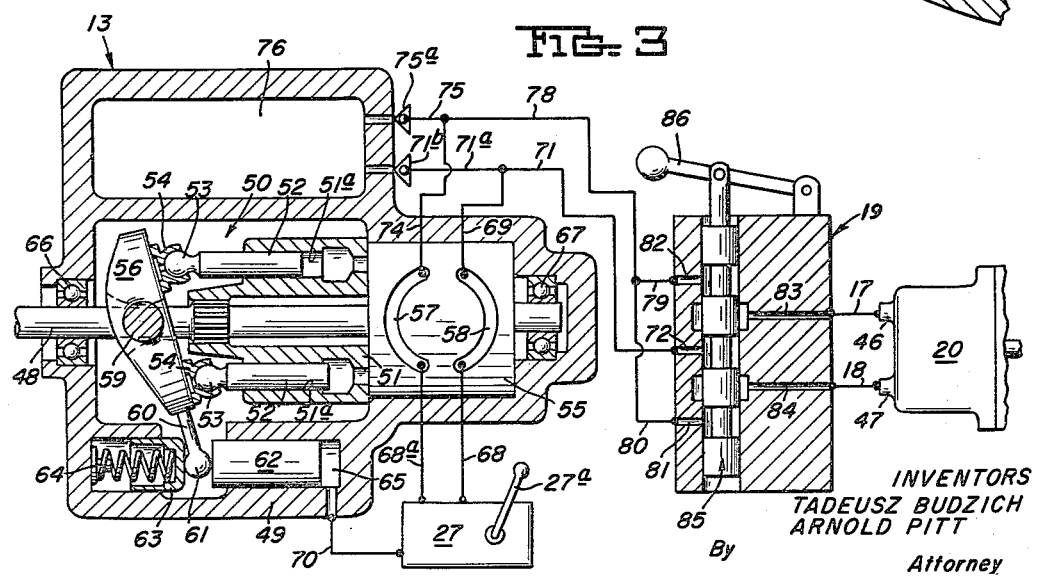
FIGURE 3 is a diagrammatic sectional view of a variable displacement pump of the synchronizing drive showing the hydraulic circuit connection to the fluid motor and the pump controls.

Referring now to FIGURE 3, the variable displacement pump 13 is mounted on the tractor 10 and is drivingly connected through a shaft 48 to the drive 15. The pump 13 preferably is of the axial piston type and includes a pump housing 49, defining a chamber 50, having a rotatable cylinder barrel 51 disposed therein. The cylinder barrel 51 is provided with a plurality of cylinder bores 51A, each having a piston 52 axially slidable therein. The pistons 52 have part spherical ends 53 universally mounting piston shoes 54 which are operative against cam plate 56. A valve plate 55 is provided with diagrammatically shown porting passages 57 and 58 providing properly phased fluid connections between cylinder bores 51A, in a well known manner. The cam plate 56 is tiltably mounted (with respect to pump housing 49) on a pin 59. An extension 60 of the cam plate 56 has a spherical pivot 61, engaging a control piston 62 and a spring guide 63 biased by spring 64. The control piston 62 is slidably mounted in a control piston chamber 65. The shaft 48, journalled in the pump housing 49, by bearings 66 and 67, is drivingly connected to the cylinder barrel 51. The porting passage 58 is connected through duct 68 with the automatic pump control 27. The pressure level of the automatic pump control 27 is adjustable by the control handle 27A, the control being arranged to feed a control signal to the control piston chamber 65 through duct 70. The porting passage 58 is connected through ducts 69 and 71 to port 72 of the direction control valve 19 and through duct 71A and conventional check valve 71B to oil reservoir 76. The porting passage 57 is connected through duct 68A to the pump control 27 and through ducts 74 and 75 and conventional check valve 75A to the oil reservoir 76. The porting passage 57 is also connected through ducts 78, 79 and 80 with ports 81 atnd 82 of the directional control valve 19. The ports 83 and 84 of the directional control valve 19 are connected through conduits 17 and 18 with ports 46 and 47 of hydraulic motor 20. The directional control valve 19 is equipped with a spool 85 having a handle 86 which in a well known manner can reverse the connection of the pump porting passages 57 and 58 with respect to the motor ports 46 and 47.

To illustrate the invention a conventional tractor with an unpowered trailer is shown. However in some instances the trailer may be provided with a separate prime mover, as with a combine harvester having a prime mover for thrashing. In this instance it may be desirable to extract the synchronizing power from the prime mover on the trailer. In this case the pump shaft 48 is connected to the prime mover on the trailer.

Operation

First, assume a direct mechanical drive between the engine 14 and the wheels 16 and 23 without any provision for synchronizing the rotation of the wheels for differences occurring in their loaded radii. Then, if the loaded radius of the driving wheel 16 is larger than the loaded radius of the driving wheel 23, the tractor 10 would be forcibly pulling the powered trailer 11, the draw bar 12 being in tension. A relative sliding motion would then take place between the periphery of the wheel 23 and the road surface. If, on the other hand, the loaded radius of the trailer wheels 23 were larger, then the situation would be reversed and the trailer 11 would tend to push the tractor 10, with the draw bar 12 being subjected to a compressive force. Since even under idealized conditions the loaded radii of the driving tractor and trailer tires are never exactly the same, a substantial amount of power would be lost and the tire life greatly reduced. Also when the trailer 11 drives the tractor 10 the driving stability of the arrangement is greatly reduced. This is the manner in which the prior art systems have operated.

According to this invention, both the wheels 16 and 23 are driven from the engine, with the speed of the wheels being synchronized irrespective of the difference in their loaded radii. This is accomplished in the following way:

Referring now to FIGURE 1, the primary driving torque for the trailer wheels 23 is transmitted from the engine 14 through the universal joints 24 and 26 and the universal shaft 25 to the wheels 23. The drive for the wheels 16 is transmitted from the engine 14 through drive 15 to the wheels 16.

Referring now to FIGURE 2, the primary driving torque from the engine is transmitted through shaft 29 to the input gear 28. In order to better understand the invention, first assume that the synchronizing pinion 43 is locked in position preventing rotation of the cage. The pinion gear 34 will then directly transmit the driving torque from the shaft 28 to the output gear 32 in a fixed ratio, the shaft 32A transmitting the rotation through key 33 to differential drive 22 of the powered trailer 11. This in effect would be a direct mechanical drive with a fixed ratio drive for the trailer. However, according to this invention the pinion 43 is not stationary but is rotating, and the rotation of the pinion 43 will induce rotation of the cage 37 because of their geared engagement. Since the cage 37 is free to rotate and since shaft 32A is free to rotate independently of shaft 28, the wheels 23 automatically will synchronize with wheels 16 to compensate for the differences in their loaded radii and this difference in shaft speed is compensated for by the rotation of cage 37. Depending on the direction of rotation of the input gear 28 this rotation of the cage 37 will proportionally either add to or subtract from the rotation of the output gear 32 thus changing the number of revolutions per minute fed into the differential 22 with respect to the revolutions per minute of the engine 14, this change being proportional to the speed of rotation of the cage 37 which provides the synchronization of the wheels. With a given direction of rotation of the shaft 29 at a given speed, rotation of the pinion gear 43 in one direction will increase the speed of the output gear 32 by revolving the cage 37 in one direction, and when the pinion gear is rotating in the opposite direction the speed of the output gear 32 will be decreased by the revolving of the cage in the opposite direction. Thus, by varying the speed and direction of rotation of the cage 37 the tractor wheels and trailer wheels can be exactly synchronized.

In the gear arrangement, as shown in FIGURE 2, with synchronizing pinion 43 stationary and with input gear 28 transmitting power to output gear 32 at fixed ratio, a reaction torque proportional to the driving torque will be transmitted to the cage 37 and then through teeth 42 to the synchronizing pinion 43. Thus the reaction torque (proportional to the driving torque) will be supplied to the hydraulic motor 20. As is well known in the art the torque developed by the fluid motor of a fixed displacement type is proportional to the motor inlet pressure. Therefore the maximum torque that can be transmitted from the input gear 28 to the output gear 32 is proportional to the inlet fluid pressure of the motor 20. When the inlet pressure is zero the device is completely unloaded and rotation of the cage will revolve the motor 20; thus the motor 20 in a well known manner becomes a pump. Hence, when the trailer drive tends to develop a higher driving torque than that equivalent to the inlet pressure of the fluid motor 20, the fluid motor 20 will become a pump having an output equivalent to the difference in speed of rotation of the trailer wheels and the tractor wheels, this torque being generated by the synchronizing rotation of the cage 37.

On the other hand, with the trailer drive tending to develope lower driving torque than that equivalent to the inlet pressure of the fluid motor 20, the fluid motor 20 will supply power to the cage 37 automatically increasing its speed to increase the speed of the trailer drive to synchronize it with the tractor drive. Hence it can be seen that torque is delivered to the shaft 32A from two sources, first from the shaft 29 through gears 28, 34 and 32, and second from the pinion 43 through cage 37 and gears 34 and 32.

The pressure level at the inlet port of the fluid motor 20 controls the magnitude of the driving torque transmitted from the engine 14 to the trailer wheels 23 maintaining this torque constant for any particular pressure setting of the pump 13 and automatically adjusting the effective drive ratio of the trailer drive. This pressure level is controlled by the pump 13 as shown in FIGURE 3. The variable displacement pump 13 is equipped with an automatic pressure compensated control 27 of a type well known in the art. The pressure compensated control 27, on a command signal from high pressure porting passage 57 or 58 transmitted through duct 68 or 68A will automatically (by admitting fluid through duct 70 to the control piston chamber 65), regulate the angular inclination of cam plate 56. The change in angular inclination will change the volume output of the pump, to maintain a constant discharge pressure. An increase in the fluid pressure in the control piston chamber 65 will overcome the bias of the spring 64 and turn the cam plate 56 around pivot 59 in a clockwise direction reducing the angle of inclination of the cam plate 56 and therefore reduce the displacement of the pump. Conversely, with a drop in control pressure in the control piston chamber 65 the biasing spring 64 will turn the cam plate 56 in a counter-clockwise direction increasing the displacement of the pump. Therefore with the above described control the pump will automatically change its output flow to maintain a constant preselected output pressure level. The level of the output pressure which the pump will maintain relatively constant is adjustable by control handle 27A. Each position of the control handle 27A corresponds to a different pressure setting of the pressure compensated control 27.

With one of the porting passages 57 or 58 (depending on pump orientation) subjected to high pressure, the other is connected through conventional check valve 75A or 71B with the reservoir 76. The pressure compensated control will regulate the volume output of the pump to maintain a constant pressure with either of the porting passages 57 or 58 subjected to pressure.

With the pump shaft 48 changing its direction of rotation when driving in forward and reverse the porting passages 57 and 58 can be directly connected to the fluid motor ports 46 and 47 without the use of direction control valve 19. However, with the pump shaft 48 directly connected to prime mover without a reversing gear and therefore always revolving in the same direction, direction control valve 19 is provided to change the polarity of the ports of the fluid motor 20 for reverse driving.

As is well known in the art, the variable displacement pump 13 of the type as shown in FIGURE 3, can work either as a pump or a motor. The arc of rotation of the cam plate 56 around pivot 59 is so arranged that from the position as shown in FIGURE 3 it can be rotated past the 90° angular inclination in respect to the axis of rotation of the shaft 48. Therefore when the fluid motor 20 becomes a pump due to required synchronizing ratio and supplies fluid under pressure to the pump, the cam plate 56 will be rotated by the control 27 past the 90° angle of inclination into the zone where the variable displacement pump will become a fluid motor. In this way the power required for synchronization of the tractor and trailer drives will be fed directly back into the prime mover without changing polarity of the pump porting passages. Normally most of the power is transmitted between the tractor and the trailer through the universal shaft 25, with only a small portion of the power being transmitted through the fluid synchronizing circuit, thus maintaining a high overall level of the efficiency of the drive. However, depending on the pressure level setting of the pressure compensated control 27, a varying percentage from zero to one-hundred percent of the total power required to drive the tractor-trailer arrangement can be diverted to the power drive of the trailer, both drives at all times being in the state of complete synchronization.

From efficiency standpoint, it is desirable that only a small portion of the total power used in traction be transmitted through the synchronizing circuit, usually equivalent to the variation in the loaded radii of the tractor and trailer drives due to tire wear, air pressure and weight of the units. However, the amount of power transmitted through the synchronizing circuit can be regulated by the fixed gear ratios of the system and the size of the synchronizing fluid pump and motor.

The system as described above permits connecting a series of trailers into a train, the trailers being fed from a single or multiplicity of pumps and using a multiplicity of fluid motors. The system as described above can also be used to synchronize a multiplicity of driving axles of a single vehicle such as a truck or a bus.

While one embodiment of our invention has been described various changes and modifications may obviously be made without departing from the true spirit and scope of the invention defined in the appended claims.

What is claimed is:

1. In a power train having a plurality of power drive members and at least one prime mover member, and driving means between said power drive members and a prime mover member, the combination therewith of a power synchronizing and control system, said system including differential synchronizing means connected to permit at least one of said drive members to inherently synchronize in speed with another drive member, said synchronizing means including a fluid energy translating system connected to transmit the required synchronizing power between said one drive member and another member.

2. The combination of claim 1 wherein there is a common prime mover driving said power drive members with said synchronizing means connected to transmit the synchronizing power between said one power drive member and said common prime mover.

3. The combination of claim 1 wherein there is a common prime mover for supplying driving power to said power drive members and an auxiliary prime mover, said synchronizing means being connected to transmit synchronizing power between said one power drive member and said auxiliary prime mover.

4. In a power train having a plurality of power drives and a common prime mover, and driving means between said power drives and said prime mover, the combination therewith of a power synchronizing and control system, said system including differential synchronizing means connected to permit at least one of said power drives to inherently synchronize in speed with another power drive, said synchronizing means including a fluid energy translating system connected between said prime mover and said one power drive adapted to transmit the power required for synchronization between said prime mover and said one power drive.

5. In a power train having a plurality of power drives and a common prime mover, and driving means between said power drives and said prime mover, the combination therewith of a power synchronizing and control system, said system including differential synchronizing means connected to permit at least one of said power drives to inherently synchronize in speed with another power drive, said synchronizing means including a fluid energy translating system arranged to transmit power between said one power drive and the prime mover, said energy translating system including a fluid motor connected to said one power drive, a variable displacement pump driven by said prime mover, duct means connecting said motor with said pump, and control means connected to permit said motor and said pump to transmit synchronizing power between said one power drive and said prime mover.

6. The combination of claim 5 wherein one of said drives is supplied with power from the prime mover through another drive.

7. In a power train having a prime mover driving first drive means having first differential means and second drive means having second differential means the combination therewith of a power synchronizing and control system, said system including differential synchronizing means connected to permit the second drive means to inherently synchronize in speed with the first drive means, said synchronizing means including a fluid energy translating system connected to transmit power between said second drive means and the prime mover, said energy translating system including a fluid motor connected to said second drive means, a fluid pump driven by said prime mover, duct means connecting said motor and said pump, and control means connected to permit the motor and pump to transmit synchronizing power between the prime mover and said second drive means.

8. The combination of claim 7 wherein the prime mover and first drive means are mounted on a tractor and the second drive means are mounted on a trailer coupled to the tractor.

9. The combination of claim 7 wherein the control means includes means to maintain the pressure level of said pump constant at a preselected level.

10. The combination of claim 7 wherein said pump is a variable discharge pump having means to maintain the pressure level constant at a preselected value.

11. The combination of claim 7 further characterized by a flow direction reversing valve interposed in said duct means.

12. In a power train having a prime mover driving first wheel means through first drive means and second wheel means driven by second drive means, and a drive shaft connected to drive said second drive means from said first drive means, the combination therewith of a power synchronizing and control system, said system including differential synchronizing means connected to permit the second drive means to inherently synchronize in speed with the first drive means, said synchronizing means including a fluid energy translating system arranged to transmit power between said second drive means and the prime mover, said energy translating system including a fluid motor connected to said second drive means, a fluid pump driven by said prime mover, duct means connecting said motor and said pump, and control means connected to permit the motor and pump to transmit synchronizing power between the prime mover and the second drive means, said control means including means to vary the displacement of the pump responsive to a control signal to maintain a selected pressure level by varying to volume of the pump.

13. The combination of claim 12 wherein said control means includes means to change the selected pressure level.

14. In a power train having a prime mover driving a load through first drive means and second drive means, the improvement which comprises said second drive means including differential synchronizing gear means connected to permit said second drive means to inherently synchronize in speed with said first drive means, said differential synchronizing gear means including reaction means permitting direct transmission of power between said prime mover and said second drive means, a fluid energy translating system connected to transmit synchronizing power between said prime mover and said reaction means.

15. The combination of claim 14 wherein said fluid energy translating system includes a pump driven by said prime mover, a fluid motor connected to said reaction means, and duct means connecting said pump and said motor.

16. The combination of claim 15 further characterized by said differential synchronizing gear means including planetary gearing connected to transmit torque between said motor and said second drive means.

17. The combination of claim 16 wherein said planetary gearing includes a rotating member in driving engagement with said motor and an orbiting member connected to deliver driving power to the second drive means.

18. The combination of claim 17 wherein the orbiting member is also in driving engagement with the prime mover and said rotating member is connected to rotate at a speed proportional to the difference in speed of the first drive means and the second drive means.

19. The combination of claim 18 wherein said rotating member is a cage and said orbiting member is journalled for rotation on said cage about an axis spaced from the axis of rotation of the cage.

References Cited by the Examiner
UNITED STATES PATENTS

| | | | |
|---|---|---|---|
| 2,004,929 | 6/35 | Centervall | 74—687 |
| 2,399,685 | 5/46 | McCoy | 60—97 XR |
| 2,580,946 | 1/52 | Orshansky et al. | 60—97 XR |
| 2,660,026 | 11/53 | Geyer | 60—6 |
| 3,005,349 | 10/61 | Everett | 60—97 XR |

JULIUS E. WEST, *Primary Examiner.*

EDGAR W. GEOGHEGAN, *Examiner.*